W. D. MOUNT.
APPARATUS FOR DETERMINING DENSITY.
APPLICATION FILED NOV. 28, 1908.
923,560.
Patented June 1, 1909.
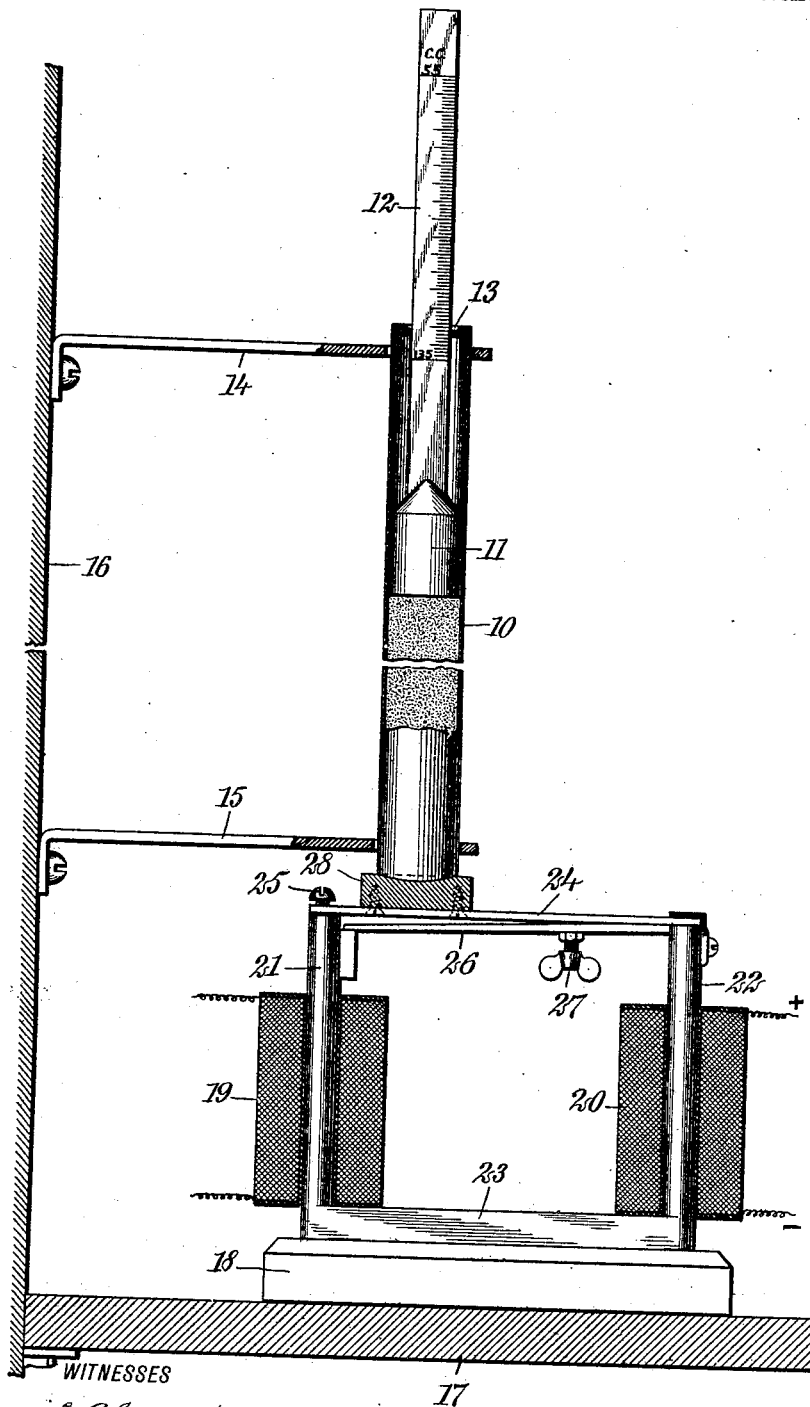
WITNESSES
L. Almquist
C. W. Fairbank
INVENTOR
William D. Mount
BY Munn & Co
ATTORNEYS

UNITED STATES PATENT OFFICE.

WILLIAM D. MOUNT, OF SALTVILLE, VIRGINIA, ASSIGNOR TO THE MATHIESON ALKALI WORKS, OF SALTVILLE, VIRGINIA.

APPARATUS FOR DETERMINING DENSITY.

No. 923,560.  Specification of Letters Patent.  Patented June 1, 1909.

Application filed November 28, 1908. Serial No. 464,942.

*To all whom it may concern:*

Be it known that I, WILLIAM D. MOUNT, a citizen of the United States, and a resident of Saltville, in the county of Smyth and State of Virginia, have invented a new and Improved Apparatus for Determining Density, of which the following is a full, clear, and exact description.

This invention relates to certain improvements in the art of determining the densities of granular or powdered materials, and the object of the invention is to provide apparatus by means of which the volume of a given weight of dry material may be accurately ascertained.

The usual method of determining the density of powdered or granular materials, involves the measuring of a given volume of the material by filling a vessel to a predetermined mark or line and then weighing the measured quantity of material to find the ratio of the weight of the volume. The personal equation enters into this operation to such a large extent that accurate results are very difficult to obtain. Various different operators in measuring out a given volume of a granular or powdered material, will obtain widely varying results, due to the fact that different operators will pack or jar the material down into the container to different extents. Further variations may arise from the fact that the surface of the material is naturally rough and uneven and it is difficult to ascertain when the container is filled exactly to a given line or mark.

In my improved apparatus, I weigh out a given quantity of the material, and by the use of delicate balances the weighing operation may be performed with the greatest of accuracy. The volume of this predetermined mass is then determined automatically in my improved apparatus, and the personal equation is almost entirely eliminated.

Reference is to be had to the accompanying drawings, forming a part of this specification, in which the figure is a side elevation of an apparatus constructed in accordance with my invention, a portion thereof being shown in vertical section.

In my improved apparatus, I employ a cylinder, tube or container 10 of uniform diameter throughout its length. The cylinder is closed at its lower end and is adapted to receive the previously-weighed material during the determining of the volume. The container is formed of any suitable material which will not be effected by the powders or other substances operated upon, and the top of the container may be open to facilitate the free insertion or removal of said powders or substances. Within the container, I provide a plunger 11, closely fitting the interior of the container but free to reciprocate therein. The plunger is provided with an upwardly-extending arm 12 constituting a handle to facilitate the removal of the plunger, and marked to also constitute it a scale. The container is provided with a removable closure 13, fitting the upper end thereof, and the closure is provided with an opening through which the scale-bearing member may freely reciprocate.

The container is supported in a vertical position in any suitable manner, as, for instance, by two arms 14 and 15, extending outwardly from a wall or other vertical support 16, but the container is unattached to the arms, so that it may be readily removed therefrom. Preferably, each arm has an opening in its outer end through which the container extends. The wall 16 also supports a shaft 17, upon which is mounted means for agitating, shaking or jarring the container. It is, of course, evident that different forms of agitators or shakers may be employed, but I preferably employ that illustrated, which is electrically operated. The shaft supports a base 18 carrying two coil magnets; one of the coils 19 is preferably connected to an alternating current generator or to other source of alternating current, while the other coil 20 is connected to a direct current generator or other source of direct current. The cores 21 and 22 of the two magnets are of wrought iron and are connected together at their lower ends by a transverse wrought iron bar 23. Rigidly connected to the upper end of the core 22 of the direct current magnet, is a steel vibrator 24 continually magnetized by the direct current magnet. This vibrator has the free end thereof terminating adjacent the end of the core 21 of the alternating current magnet, and its movement is limited by a suitable adjusting screw 25. As the current in the coil 19 alternates, the vibrator is alternately attracted or repulsed and thus caused to vibrate. The upward movement of the vibrator during the repulsion is aided by a brass spring 26 carrying an adjusting screw 27 engaging with the under side of the vibrator. The vibrator preferably does not contact directly with the container 10, but the vibrations are communicated to said container. As shown, the vibrator carries a wooden button 28 which supports the container, and eliminates to a large extent the noise which would otherwise be produced by the tapping of the vibrator directly on the container.

In the use of my improved apparatus, the weighing of a given quantity of material is ascertained or a predetermined quantity is weighed out, as, for instance, one hundred grams. The material is then transferred to the cylinder 10, the weighted plunger 11 is placed in position, and the vibrator is operated for a predetermined length of time. The vibrating action jars and shakes the material down into a compact state beneath the weighted plunger 11, and by operating the apparatus the same length of time for each determination, the same extent of compactness will be obtained and successive operations upon the same material will give the same results. If the one hundred grams of material be taken and the scale is calibrated to read in cubic centimeters, then the density is readily obtained by dividing the weight by the volume reading. If desired, the weight of the empty container and the weight of the container with a quantity of the substance therein, may be ascertained in succession, and then the volume of the substance ascertained directly by operating the vibrator for a predetermined time and noting the reading on the arm 12 adjacent the outer surface of the closure 13.

Having thus described my invention, I claim as new and desire to secure by Letters Patent:

1. An apparatus for determining the density of powdered or granular materials, comprising a container, a plunger slidably mounted therein, means for determining the position of the plunger, and means for jarring the container to settle the contents.

2. An apparatus for determining the density of powdered or granular materials, comprising a vertically-disposed cylinder, a weighted plunger closely fitting therein and having an upwardly-extending arm calibrated to indicate the volume of the space below the plunger, and means for tapping, jarring, or agitating the cylinder.

3. An apparatus for determining the density of powdered or granular materials, comprising a container, a plunger disposed therein, a scale for indicating the volume of the space below said plunger, and a vibrator for settling the material within the container.

4. An apparatus for determining the density of powdered or granular materials, comprising a container, a plunger disposed therein, a scale for indicating the volume of the space below said plunger, and an electrically operated vibrator for settling the material within the container.

5. An apparatus for determining the density of powdered or granular materials, comprising a container, a plunger disposed therein, a scale for indicating the volume of the space below said plunger, a magnetized vibrator for settling the material within the container and an alternating current magnet for moving said vibrator.

In testimony whereof I have signed my name to this specification in the presence of two subscribing witnesses.

WILLIAM D. MOUNT.

Witnesses:
J. F. WATSON,
W. W. RUBLE.